United States Patent
Chang et al.

(10) Patent No.: US 8,989,268 B2
(45) Date of Patent: Mar. 24, 2015

(54) METHOD AND APPARATUS FOR MOTION ESTIMATION FOR VIDEO PROCESSING

(75) Inventors: Yuan-Teng Chang, Fengshan (TW); Wen-Hao Chung, Sanchong (TW)

(73) Assignee: Industrial Technology Research Institute, Hsinchu (TW)

( * ) Notice: Subject to any disclaimer, the term of this patent is extended or adjusted under 35 U.S.C. 154(b) by 503 days.

(21) Appl. No.: 12/955,631

(22) Filed: Nov. 29, 2010

(65) Prior Publication Data

US 2012/0020410 A1 Jan. 26, 2012

(30) Foreign Application Priority Data

Jul. 21, 2010 (TW) .............................. 99124049 A

(51) Int. Cl.
- H04N 11/02 (2006.01)
- H04N 19/43 (2014.01)
- H04N 19/61 (2014.01)
- H04N 19/523 (2014.01)

(52) U.S. Cl.
CPC ............... H04N 19/43 (2013.01); H04N 19/61 (2013.01); H04N 19/523 (2013.01)
USPC .................................................. 375/240.16

(58) Field of Classification Search
USPC ............................................. 375/240, 240.16
See application file for complete search history.

(56) References Cited

U.S. PATENT DOCUMENTS

| | | | |
|---|---|---|---|
| 5,428,403 A * | 6/1995 | Andrew et al. ............... 348/699 |
| 6,968,008 B1 | 11/2005 | Ribas-Corbera et al. | |
| 7,580,456 B2 | 8/2009 | Li et al. | |
| 7,609,763 B2 | 10/2009 | Mukerjee et al. | |
| 7,646,437 B1 | 1/2010 | Dumitras et al. | |
| 2005/0226334 A1 | 10/2005 | Han | |
| 2006/0002474 A1 * | 1/2006 | Au et al. ............... 375/240.16 |
| 2007/0002948 A1 | 1/2007 | Shibahara et al. | |
| 2007/0217515 A1 | 9/2007 | Wang et al. | |
| 2008/0002772 A1 | 1/2008 | Song et al. | |

FOREIGN PATENT DOCUMENTS

| | | |
|---|---|---|
| CN | 1830214 A | 9/2006 |
| CN | 1947426 A | 4/2007 |

(Continued)

OTHER PUBLICATIONS

"Analysis and VLSI Design for Reusable Fractional Motion Vector Cost Generator", Pub. Date, Apr. 40, 2007.

(Continued)

Primary Examiner — Andy Rao
Assistant Examiner — Tyler Edwards
(74) Attorney, Agent, or Firm — McClure, Qualey & Rodack, LLP

(57) ABSTRACT

Method and apparatus for motion estimation for video processing. An embodiment of a method for motion estimation includes the following steps. In the course of motion estimation, integer motion estimation is performed with respect to a macroblock to generate a plurality of integer motion vectors. It is determined, according to a portion of the motion vectors, which correspond to a plurality of block modes, whether the integer motion vectors of each block mode are substantially equal to those of a corresponding upper-layer block mode of the block mode, so as to determine whether to perform or skip fractional motion estimation of the block mode, wherein each corresponding upper-layer block mode(s) of the block modes is greater than the block mode.

10 Claims, 7 Drawing Sheets

MODE 1

MODE 2

MODE 3

MODE P8x8

(56) References Cited

FOREIGN PATENT DOCUMENTS

| CN | 101521822 A | 9/2008 |
|---|---|---|
| CN | 101600112 A | 12/2009 |
| EP | 1353514 B1 | 12/2005 |
| TW | 200850006 | 12/2008 |
| WO | 2008149327 A2 | 12/2008 |

OTHER PUBLICATIONS

TW Office Action dated Feb. 26, 2013.
Abstract of "Analysis and VLSI Design for Reusable Fractional Motion Vector Cost Generator".
English Abstract for US2005226334 (corresponding to CN1947426).
English Abstract for US2007002948 (corresponding to CN1830214).
English Abstract translation of TW200850006 (Published Dec. 16, 2008).
English Abstract translation of CN101521822 (Published Sep. 2, 2009).
English Abstract translation of CN101600112 (Published Dec. 9, 2009).
Wu, C.L., et al.; "A High Performance Three-Engine Architecture for H.264/AVC Fractional Motion Estimation;" IEEE; 2008; pp. 133-136.
Kuo, T.Y., et al.; "SIFME: A Single Iteration Fractional-Pel Motion Estimation Algorithm and Architecture for HDTV Sized H.264 Video Coding;" pp. 1-4.
Song, Y., et al.; "Hardware-Oriented Direction-Based Fast Fractional Motion Estimation Algorithm in H.264/AVC;" IEEE; 2008; pp. 1009-1012.
Wang, Y.J, et al.; "A Fast Algorithm and Its VLSI Architecture for Fractional Motion Estimation for H.264/MPEG-4 AVC Video Coding;" IEEE Transactions on Circuits and Systems for Video Technology; vol. 17; No. 5; May 2007; pp. 578-563.
TW Office Action dated Apr. 25, 2014.
Zhang, et al.: "Fast sub-pixel motion estimation based on directional information and adaptive block classification"; published Jul. 29, 2008; Copyright 2008; The Institution of Engineering and Technology; pp. 622-627.

\* cited by examiner

SCENARIO 1: (x-dir, y-dir) = (+, +)

SCENARIO 2: (x-dir, y-dir) = (+,-)

SCENARIO 3: (x-dir, y-dir) = (-, -)

SCENARIO 4: (x-dir, y-dir) = (-, +)

METHOD AND APPARATUS FOR MOTION ESTIMATION FOR VIDEO PROCESSING

This application claims the benefit of Taiwan application Serial No. 99124049, filed Jul. 21, 2010, the subject matter of which is incorporated herein by reference.

BACKGROUND

1. Technical Field

The disclosure relates in general to a method and an apparatus for motion estimation, and more particularly to a method using fractional motion estimation and an apparatus for motion estimation.

2. Description of the Related Art

The H.264/Advanced Video Coding (AVC) video compression standard stipulated by the International Telecommunication Union (ITU-T) and the International Organization for Standardization (ISO)/International Electrotechnical Commission (IEC) achieves high compression ratio and has been widely used in many applications such as blue-ray disc, Internet Protocol Television (IPTV), and High Definition Television (HDTV) broadcasting. The compression standard employs two prediction methods for predicting the pixels of the currently encoded macroblock. One method is intra frame prediction, which predicts the pixels of the currently encoded macroblock according to the spatial correlation between adjacent macroblocks. The other method is inter frame prediction, which predicts the pixels of the currently encoded macroblock according to the time correlation between consecutive frames. The method for motion estimation finds the best matching region from the previous frame for each of the macroblocks that need to be encoded, and generates a corresponding motion vector. In addition to performing integer motion estimation with respect to the integer pixels, the method for motion estimation could perform fractional motion estimation to increase the accuracy level up to ½ or ¼ pixel.

The inter frame prediction, despite having great contribution in terms of compression performance, requires a large amount of computation time. For example, the H.264/AVC standard provides motion estimation for variable-size block modes, but motion estimation occupies about 60%-90% of the encoding time. Moreover, in the H.264 reference software, to obtain the best block mode, full search is performed with respect to all block modes, wherein integer motion estimation and fractional motion estimation are respectively performed. Thus, the complexity of the encoding computation according to H.264 is much higher than the previous video standard such as MPEG-1 or MPEG-2, which adopts fix-sized macroblock for motion estimation. The application of real-time encoding, such as the application of video recording in a hand-held apparatus, will use a large amount of computation resources or require a high-performance processor for encoding, thus increasing the cost for the implementation of an encoder.

SUMMARY

Embodiments are directed to a method and an apparatus for motion estimation, which could be used in a video coding process which performs motion estimation at variable accuracy levels with respect to the blocks with different sizes. An embodiment provides a method for motion estimation, which reduces the number of the modes requiring fractional motion estimation, hence increasing the efficiency of fractional motion estimation. Another embodiment provides a method for motion estimation, which reduces the number of search positions during fractional motion estimation, so that the required computation resources or hardware resources are reduced. Under the circumstances that the number of the modes requiring fractional motion estimation is decreased according to the above embodiments, fractional motion estimation could be performed with fewer search positions. Thus, the complexity and the required computation time for coding are reduced, and the overall computation time of motion estimation is largely reduced.

According to a first aspect, an embodiment of a method for motion estimation is provided. The method includes the following steps. In the course of motion estimation, integer motion estimation is performed with respect to a macroblock to generate a plurality of integer motion vectors. It is determined, according to a portion of the motion vectors, which correspond to a plurality of block modes, whether the integer motion vectors of each block mode are substantially equal to those of corresponding upper-layer block mode(s) of the block mode, so as to determine whether to perform or skip fractional motion estimation of the block mode, wherein each corresponding block of the upper-layer block mode(s) of the block mode is greater than the block mode. Thus, the number of the modes requiring fractional motion estimation is decreased.

According to a second aspect, a method for motion estimation is provided. The method includes the following steps. In the course of motion estimation, a first fractional motion estimation is performed to determine a first fractional optimum position according to a direction of a predicted motion vector, and a second fractional motion estimation is performed to determine a second fractional optimum position according to the direction of the predicted motion vector and the first fractional optimum position, wherein accuracy of the second fractional motion estimation is higher than that of the first fractional motion estimation. Thus, in the course of the fractional motion estimation, the number of search positions is reduced.

According to a third aspect, an apparatus with motion estimation is provided. The apparatus includes a motion estimation unit and a control unit. In the course of motion estimation, the motion estimation unit performs integer motion estimation with respect to a macroblock to generate a plurality of integer motion vectors. The control unit determines, according to a portion of the integer motion vectors, which correspond to a plurality of block modes, whether the integer motion vectors of each block mode are substantially equal to those of corresponding upper-layer block mode(s) of the block modes, and selectively controls the motion estimation unit to perform or skip fractional motion estimation of the block mode, wherein each corresponding block of the upper-layer block mode(s) of the block mode is greater than the block mode.

According to a fourth aspect, an apparatus with motion estimation is provided. The apparatus includes an integer motion estimation unit and a fractional motion estimation unit. In the course of motion estimation, in response to an integer motion vector generated by integer motion estimation unit, the fractional motion estimation unit refines the integer motion vector. The fractional motion estimation unit performs a first fractional motion estimation with respect to the integer motion vector to determine a first fractional optimum position according to the direction of a predicted motion vector, and performs a second fractional motion estimation to determine a second fractional optimum position according to the direction of the predicted motion vector and the first fractional optimum position, wherein accuracy of the second fractional motion estimation is higher than that of the first fractional motion estimation.

The above and other aspects of the disclosure will become better understood with regard to the following detailed description of the preferred but non-limiting embodiment(s). The following description is made with reference to the accompanying drawings.

DETAILED DESCRIPTION

A number of embodiments are exemplified below according to the H.264 standard. However, the following embodiments could also be used in other implementations of video standards based on H.264 such as scalable video coding (SVC), or used in storage media such as blue-ray discs and high definition DVD (HD-DVD), or TV broadcasting such as high definition TV or internet protocol TV (IPTV). Thus, the embodiments disclosed below could be used in various occasions of video processing or implemented in various computation apparatuses, hand-held apparatuses or video processing apparatuses.

First Embodiment

The first embodiment provides a method for motion estimation capable of decreasing the number of the modes requiring fractional motion estimation. In the course of the fractional motion estimation of the present embodiment, the modes requiring fractional motion estimation are determined according to a portion of motion vectors obtained from integer motion estimation, so that the number of the modes requiring fractional motion estimation is reduced and the efficiency of fractional motion estimation is increased.

Figure 1:
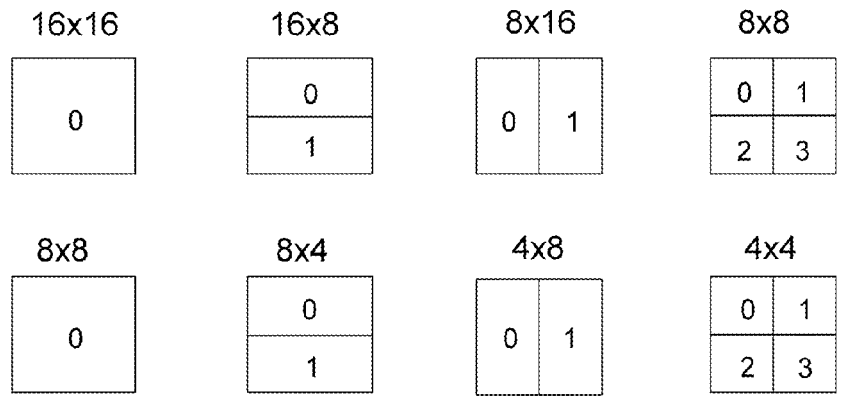
FIG. 1 shows various types of H.264 block modes.

The present embodiment could be used in the video coding using variable block-size motion estimation. As an example, H.264/AVC (referred to as H.264 hereinafter) allows different block modes by dividing a 16×16 macroblock into several blocks of different sizes, and totally seven block modes of different sizes are provided. As indicated in FIG. 1, the block modes could be categorized as macroblock type and 8×8 type (sub-macroblock type or 8×8 type). The macroblock type includes 16×16, 16×8, 8×16 and 8×8 block modes. The 8×8 type includes 8×8, 8×4, 4×8 and 4×4 block modes.

Figure 2:
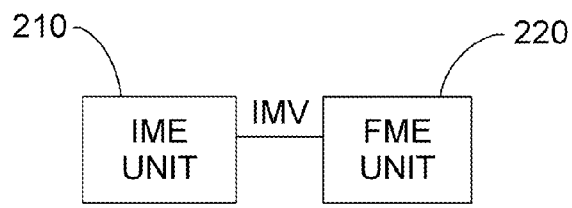
FIG. 2 shows an implementation of motion estimation by hardware.

FIG. 2 shows an implementation of motion estimation by hardware. Integer motion estimation (IME) and fractional motion estimation (FME) are respectively implemented by two circuit stages such as an IME unit 210 and an FME unit 220, which could be realized by two pipeline stages. However, other implementations could be used in other examples. The IME unit 210 generates 41 integer motion vectors (IMV) of the seven block modes from a macroblock according to variable-block-size motion estimation (VBSME). Then, the FME unit 220 sequentially increases the accuracy of the motion vector of each block mode. In other words, the FME unit 220 refines the motion vectors. Lastly, after the processing by the FME unit 220, the mode with minimum cost will be selected as the optimum mode for coding.

When the method of the first embodiment is applied to motion estimation circuit of FIG. 2, which of the block modes required to be processed by the FME unit 220 are determined through comparison according to a portion of motion vectors obtained by the IME unit 210. Thus, the FME unit 220 does not need to perform fractional motion estimation with respect to the integer motion vectors IMV of all modes. Thus, the computation time and the computation resources required for fractional motion estimation are reduced, and the circuit complexity of the circuit implementation of the FME unit 220 could be simplified.

Figure 3:
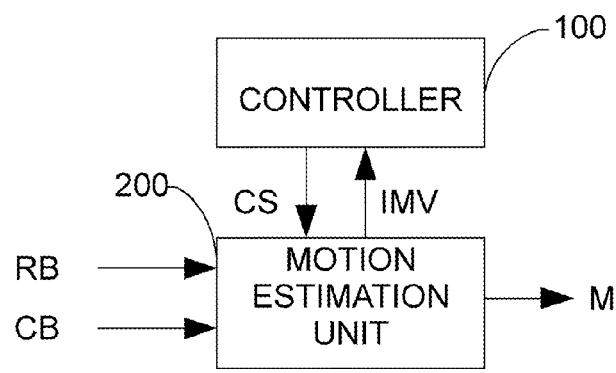
FIG. 3 shows an example of a portion of a circuit block diagram of a video encoder.

FIG. 3 shows an example of a portion of a circuit block diagram of a video encoder. A motion estimation unit 200 is implemented according to the architecture of FIG. 2 to generate the optimum motion vectors MVB. The controller 100 obtains a portion of integer motion vectors from the motion estimation unit 200, and determines which block modes requiring fractional motion estimation according to the integer motion vectors. The controller 100 controls the motion estimation unit 200, for example, through at least one control signal CS.

The method of the present embodiment determines which modes require fractional motion estimation through the comparison of a portion of motion vectors obtained from integer motion estimation. The details of the method are exemplified below.

According to H.264, the rate-distortion cost (RD cost) could be used as a criterion for determining the mode with minimum cost. The RD cost could be expressed as: $\lambda*bit\_len(mvd)+SATD$, wherein $\lambda$ is determined by a quantization parameter, bit_len (mvd) denotes the coded bits of motion vectors difference (mvd), and SATD denotes the sum of absolute transformed difference. With regard to H.264, the present embodiment sets the criteria for determining the mode according to the following viewpoints to reduce the motion estimation of redundant modes. One viewpoint is that: if the integer motion vectors of two modes are substantially identical, then the SATD of the two modes will be very close. Here, the term "substantially identical (or equal)" refers to the integer motion vectors of two modes being identical (for example, the coordinates of the two motion vectors are identical) or the difference of the integer motion vectors of two modes being within a predetermined range, for example, the coordinate difference (at least one of the x coordinate and the y coordinate) between two motion vectors being within the range of one or two pixels, and the range could be defined or set according to the need in practical application. The other viewpoint is that: it is probably that the motion vector of one mode may approach the upper-layer block of the mode. As indicated in FIG. 1, the partition 0 of the mode 2 (that is, the 16×8 block mode) is viewed as the upper-layer block of the partition 0 or 1 of the mode 4 (that is, the 16×16 block mode is divided into four 8×8 block modes), and the motion vectors of the latter normally approach the motion vectors of the former. Thus, the method for motion estimation according to the first embodiment is exemplified in two examples below.

Figure 4:
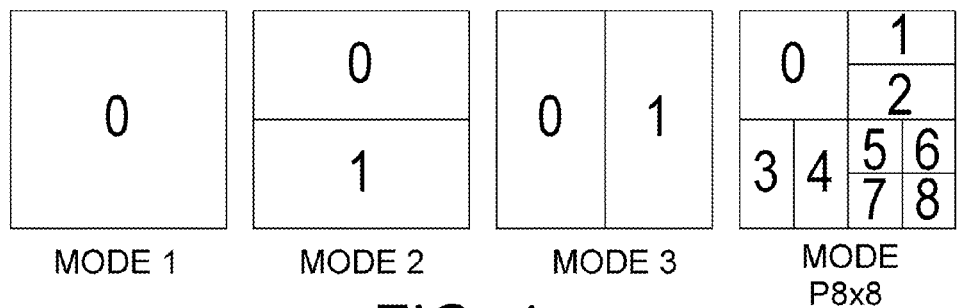
FIG. 4 shows the partition and naming of the modes 1 to 3 and mode P8×8.
Figure 5:
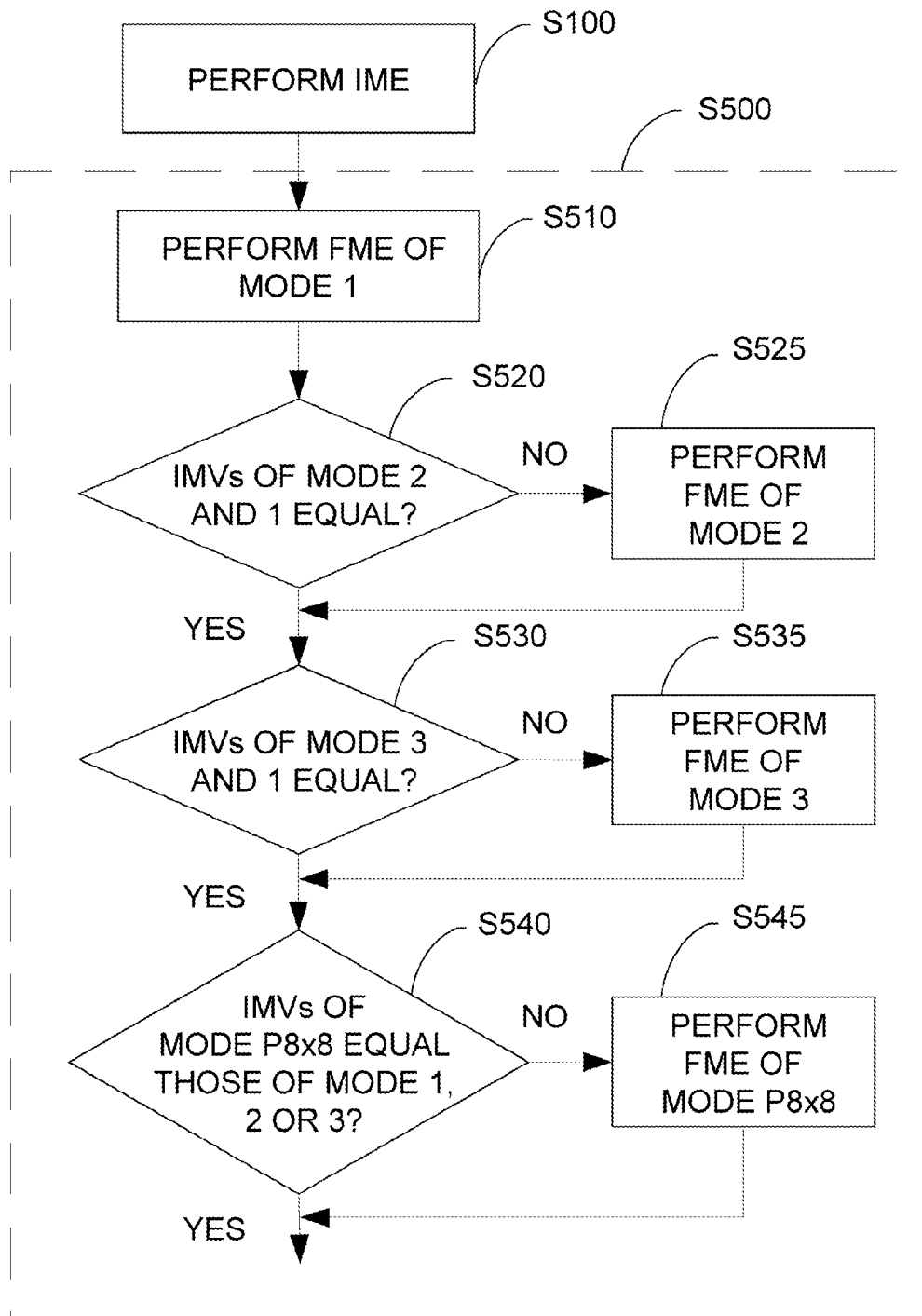
FIG. 5 shows a flowchart of a first example of a method for motion estimation according to a first embodiment.

Referring to FIG. 5, a flowchart of a first example of a method for motion estimation according to the first embodiment is shown. In the course of motion estimation, as indicated in step S100, integer motion estimation is performed with respect to a macroblock, such as seven block modes for H.264, to generate a plurality of corresponding integer motion vectors. Next, as indicated in step S500, a method of fractional motion estimation of the present embodiment is performed according to a portion of motion vectors obtained from integer motion estimation to determine whether the integer motion vectors of a mode are substantially equal to the integer motion vectors of the upper-layer block mode so as to determine whether to perform or skip the fractional motion estimation of the mode. The definition of the modes, taken H.264 for example, is indicated in FIGS. 1 and 4. The modes 1-3 respectively denote three block modes, namely, 16×16, 16×8 and 8×16. The mode P8×8 denotes the 8×8 type, wherein each 8×8 block and its partitions could be resulted in four different blocks of different sizes such as 8×8, 8×4, 4×8 and 4×4. The mode P8×8 of FIG. 4 is a macroblock with partitions 0-8, wherein the integer motion vector of a partition n of a mode is referred to as IMVn.

The fractional motion estimation of FIG. 5 includes the following steps. Firstly, as indicated in step S510, the fractional motion estimation of the mode 1 is performed. Next, the method proceeds to step S520, whether the integer motion vectors of the mode 2 are substantially equal to the integer motion vector of the mode 1 is determined. That is, whether the integer motion vectors (that is, IMV0 and IMV1) of partitions 0 and 1 of the mode 2 are all substantially equal to the integer motion vector (that is, IMV0) of the mode 1 is determined. If not, then the method proceeds to step S525, wherein the fractional motion estimation of the mode 2 is performed. That is, fractional motion estimation is performed with respect to the integer motion vectors of the mode 2. For example, the two integer motion vectors IMV0 and IMV1 of the mode 2 are refined by the FME unit 220 of motion estimation unit 200, and after step S525 is completed, the method proceeds to step S530. If the determination result in step S520 is affirmative, this implies that step S525 could be skipped.

The method of the present example proceeds to step S530 to determine whether the integer motion vectors of the mode 3 and the mode 1 are substantially equal. That is, whether the integer motion vectors IMV0 and IMV1 of partitions 0 and 1 of the mode 3 are all equal to the integer motion vectors IMV0 of the mode 1 is determined. If not, then the method proceeds to step S535, the fractional motion estimation of the mode 3 is performed, and after step S535 is completed, the method proceeds to step S540. If the determination result in step S530 is affirmative, this implies that step S535 could be skipped.

The method of the present example proceeds to step S540 to determine whether the integer motion vectors of the mode P8×8 are substantially equal to the integer motion vectors of the mode 1, 2 or 3. If not, the method proceeds to step S545, the fractional motion estimation of the mode P8×8 is performed. If the determination result in step S540 is affirmative, this implies that step S545 could be skipped. The determination criterion of step S540 is one of the criteria 1, 2 and 3. Criterion 1: the integer motion vectors IMV0-IMV8 of the mode P8×8 are all equal to the integer motion vectors IMV0 of the mode 1. Criterion 2: the integer motion vectors IMV0-MV2 of the mode P8×8 are all equal to the integer motion vectors IMV0 of the mode 2, and the integer motion vectors IMV3-MV8 of the mode P8×8 are all equal to the integer motion vectors IMV1 of the mode 2. Criterion 3: the integer motion vectors IMV0, IMV3 and IMV4 of the mode P8×8 are all equal to the integer motion vector IMV0 of the mode 3, and the integer motion vectors IMV1, IMV2, and IMV5-IMV8 of the mode P8×8 are all equal to the integer motion vector IMV1 of the mode 3. In order to reduce the number of the modes requiring fractional motion estimation with respect to the integer motion vectors of the mode P8×8 in step S540, in an example, it is sufficient to use the integer motion vectors of the optimum mode (that is, the mode with minimum RD cost) of the 8×8 types (including the modes 8×8, 8×4, 4×8 and 4×4) of each of the four 8×8 blocks obtained from the partitions of a macroblock. Thus, in step S540, the comparison could be based on at least 4 to at most 16 IMVs, and at least the integer motion vectors IMV of the optimum mode are used for comparison, and the modes that are not used could be excluded from criterion 1, 2 or 3. Suppose the optimum integer motion vectors of the mode P8×8 are the integer motion vectors IMV0 of the four 8×8 block modes. If the integer motion vectors IMV0 of the four modes P8×8 are all equal to the integer motion vector IMV0 of the mode 1, this implies that criterion 1 is satisfied, and there is no need to compare the integer motion vectors IMV2-IMV8 which are not the IMV of the optimum mode. Suppose the integer motion vectors of the mode P8×8 are the integer motion vectors IMV0 of two 8×8 block modes, the integer motion vectors IMV1 and IMV2 of one 8×4 block mode, the integer motion vectors IMV3 and IMV4 of one 4×8 block mode, and the integer motion vectors IMV5-IMV8 of one 4×4 block mode. If the integer motion vectors IMV0-IMV2 of this example are equal to the integer motion vectors IMV0 of the mode 2, and the integer motion vectors IMV3-IMV8 are all equal to the integer motion vectors IMV1 of the mode 2, then criterion 2 is satisfied. Other scenarios could be known in the similar manner, and are not repeated here for the sake of brevity.

After step S540 or S545 is completed, the method for motion estimation could further determine suitable block modes and motion vectors according to the fractional motion vectors obtained in step S500 and the known integer motion vectors. For example, the H.264 motion estimation determines optimum block modes and motion vectors according to the rate-distortion cost.

By simulations, tests for the first example of the present embodiment on a number of exemplary video files (such as akiyo, news, silent, foreman, mobile) show that the number of clock cycles required for fractional motion estimation could be reduced by decreasing the number of the modes requiring fractional motion estimation, and the reduction in the number of clock cycles is about 60% of the H.264 reference software. Besides, the quality similar to the H.264 reference software could also be achieved.

Figure 6:
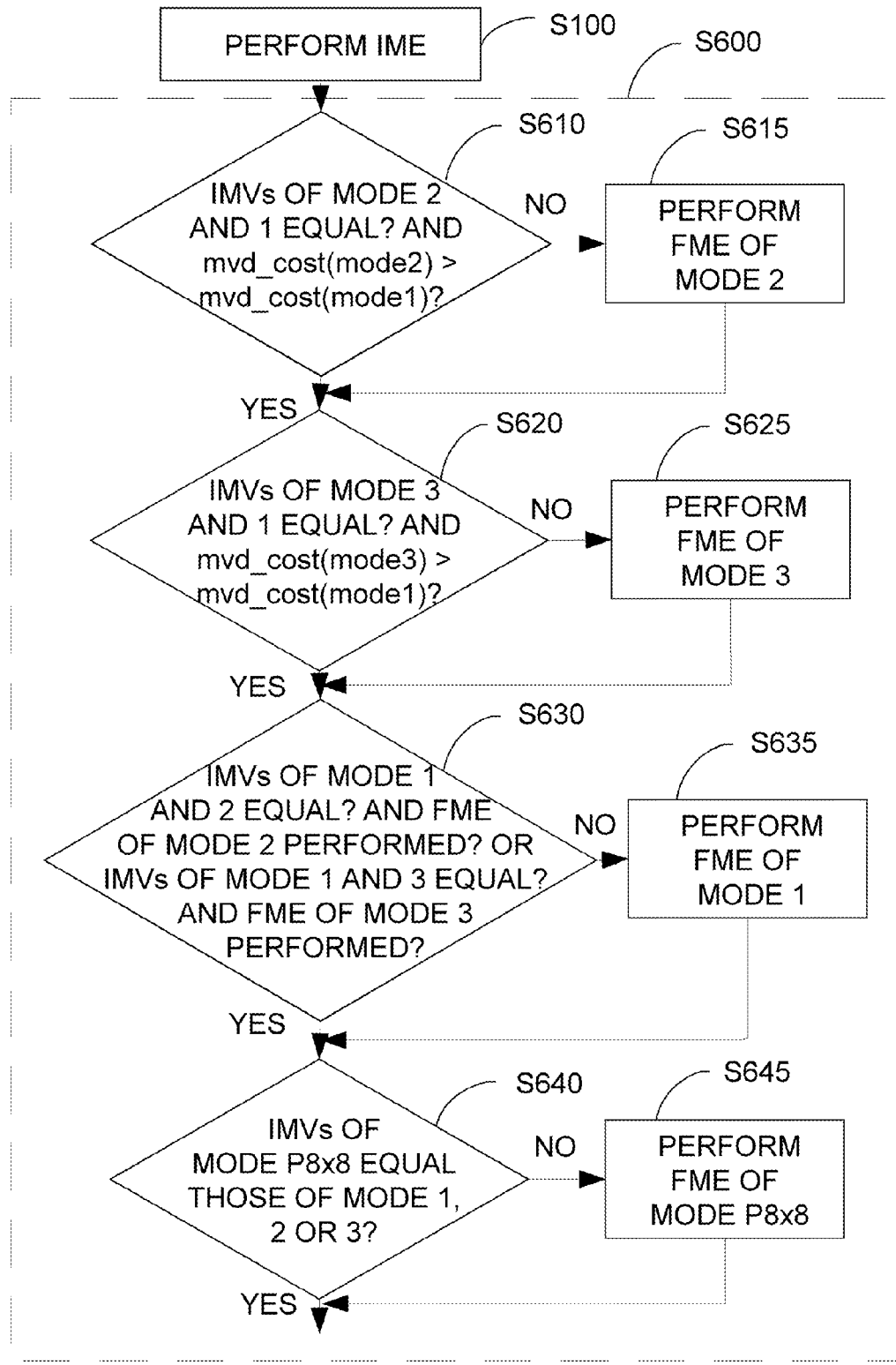
FIG. 6 shows a flowchart of a second example of a method for motion estimation according to the first embodiment.

Referring to FIG. 6, a flowchart of a second example of a method for motion estimation according to the first embodiment is shown. The main difference between the example of FIG. 6 and the example of FIG. 5 is as follows. According to a method of fractional motion estimation as indicated in step S600, a determination as to whether to perform the fractional motion estimation of a mode is made according to the number of encoded bits of the motion vector difference in addition to a portion of motion vectors obtained from integer motion estimation for comparison. That is, the determination is made according to the relationship of integer motion vectors IMV and motion vector differential cost mvd_cost between the mode and its upper-layer block mode. The rate-distortion cost RD cost is expressed as: λ*bit_len (mvd)+SATD, wherein λ*bit_len (mvd) denotes the motion vector differential cost mvd_cost.

The fractional motion estimation of FIG. 6 includes the following steps. As indicated in step S610, it is determined whether the integer motion vectors of the mode 2 and mode 1 are substantially equal, and the motion vector differential cost of the mode 2 is greater than the motion vector differential cost of the mode 1 (that is, whether mvd_cost (mode2)>mvd_cost (mode 1)), wherein modeN denotes the mode N, N is a positive integer. If not, the method proceeds to step S615, the fractional motion estimation of the mode 2 is performed, and after step S615 is completed, the method proceeds to step S620. If the determination result in step S610 is affirmative, this implies that step S615 could be skipped.

The method then proceeds to step S620 to determine whether the integer motion vectors of the mode 3 and mode 1 are substantially equal, and the motion vector differential cost of the mode 3 is greater than the motion vector differential cost of the mode 1 (that is, whether mvd_cost (mode3)>mvd_cost (mode 1)). If not, then the method proceeds to step S625, the fractional motion estimation of the mode 3 is performed, and after step S625 is completed, the method proceeds to step S630. If the determination result in step S620 is affirmative, this implies that step S625 could be skipped.

Then, the method proceeds to step S630, wherein it is determined whether the integer motion vectors IMV of the mode 1 are substantially equal to those of the mode 2 and the FME of the mode 2 is performed, or the integer motion vectors IMV of the mode 1 and mode 3 are substantially equal and the FME of the mode 3 is performed. If not, then the method proceeds to step S635, the fractional motion estimation of the mode 1 is performed, and after step S635 is completed, the method proceeds to step S640. If the determination result in step S630 is affirmative, this implies that step S635 could be skipped.

Then, the method proceeds to step S640 to determine whether the integer motion vectors of the mode P8×8 are substantially equal to those of the mode 1, 2 or 3. If not, the method proceeds to step S645 to perform the fractional motion estimation of the mode P8×8. If the determination result in step S640 is affirmative, this implies that step S645 could be skipped. Since steps S640 and S645 of FIG. 6 are similar to steps S540 and S545 of FIG. 5, the similarities are not repeated here.

After step S640 or S645 is completed, the method for motion estimation could further determine suitable block modes and motion vectors according to the fractional motion vectors obtained in step S600 and the known integer motion vectors. For example, the H.264 motion estimation determines optimum block modes and motion vectors according to the rate-distortion cost.

In the second example of FIG. 6, the motion vector differential cost is further used as a determination criterion, so that the required computation resources are reduced and the bit rate could be similar to the reference software. In hardware implementation of the two examples of the first embodiment, a determination circuit is needed, which could be realized by comparators, adders, or logic circuitry. Referring to FIG. 3, the determination circuit could be realized in the controller 100. In addition, in this example, if the integer motion vectors of the optimum mode from the integer motion vectors of the mode P8×8 are adopted in the implementation of step S540, a reduced amount of IMVs are then required to be transmitted to the controller 100 and it is sufficient for the controller 100 to control the motion estimation unit 200 which determines whether to perform or to skip the modes. In this manner, the efficiency of fractional motion estimation could be enhanced.

The controller 100 could be realized as an independent circuit, or a control circuit of a video processor (e.g., an encoder or a video transmission apparatus), such as an encoding controller.

Second Embodiment

A second embodiment provides a method for motion estimation to reduce the number of search positions in the course of fractional motion estimation. In the course of fractional motion estimation with respect to an integer motion vector, a plurality of first fractional search positions are generated according to a direction of a predicted motion vector and a first fractional optimum position is determined accordingly. For further refinement, a plurality of second fractional search positions are then generated according to the direction of the predicted motion vector and the first fractional optimum position so as to determine a second fractional optimum position. In this way, the efficiency of fractional motion estimation is increased, the required computation resources are reduced, and the fractional motion estimation could be implemented by less hardware resources.

Figure 7:
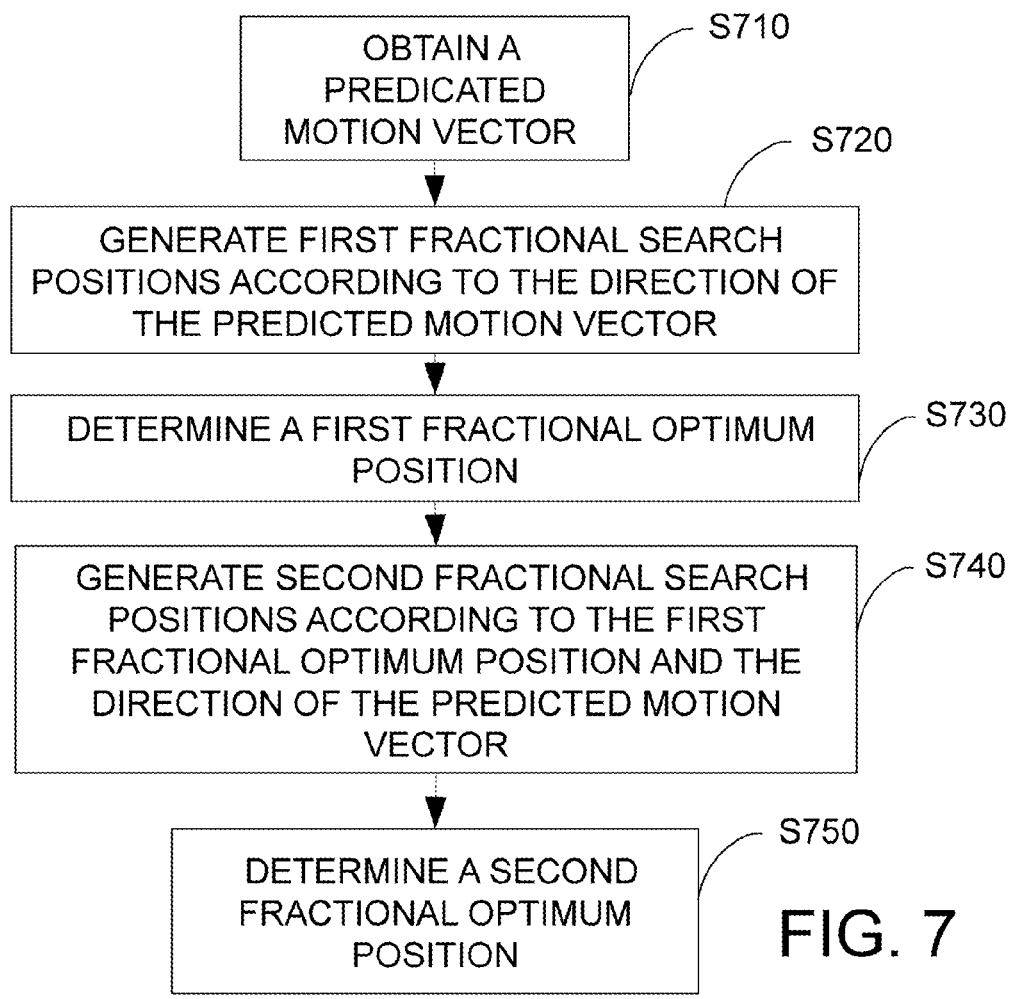
FIG. 7 shows a flowchart of a method for motion estimation according to a second embodiment.
Figure 8:
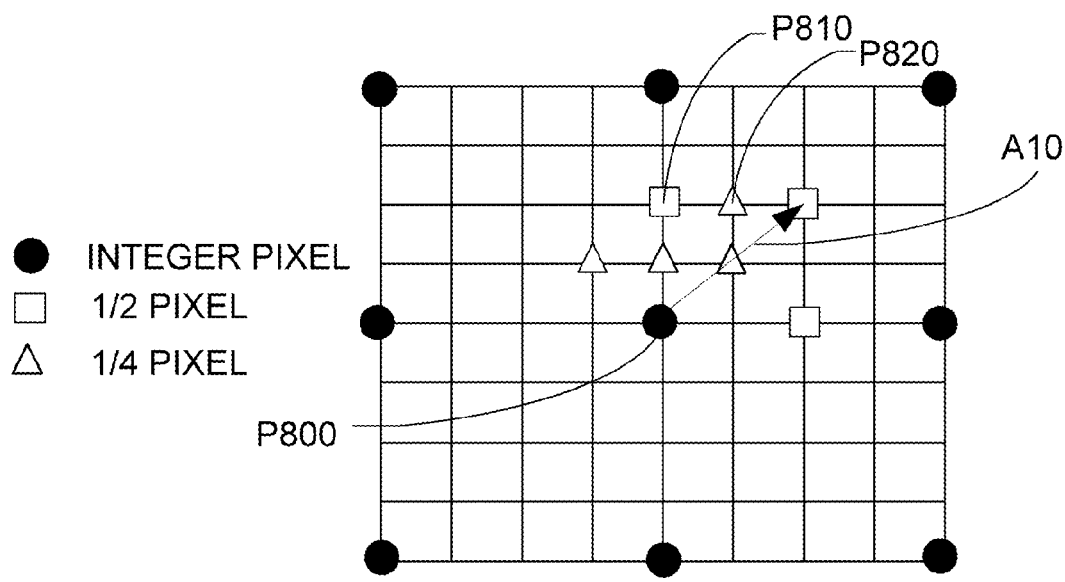
FIG. 8 shows the process of locating fractional optimum position according to a method for the motion estimation of the second embodiment.
Figure 9A:
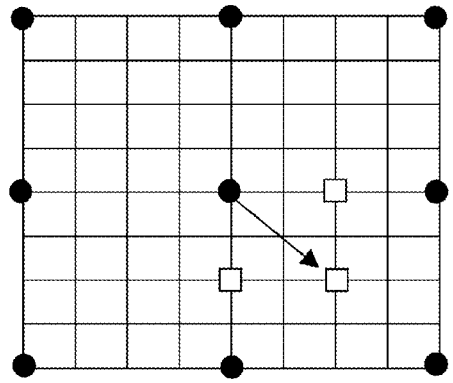
FIGS. 9A-9D respectively show four scenarios for selecting first fractional search positions and directions.
Figure 9B:
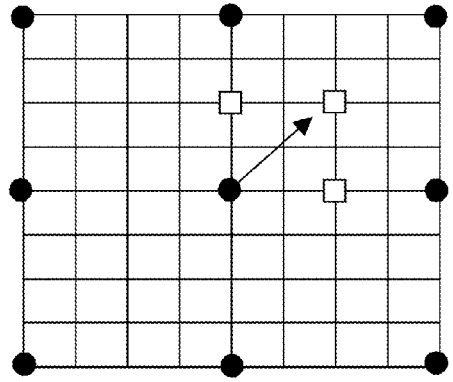
Figure 9C:
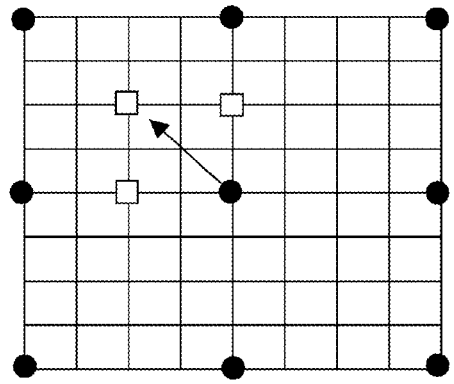
Figure 9D:
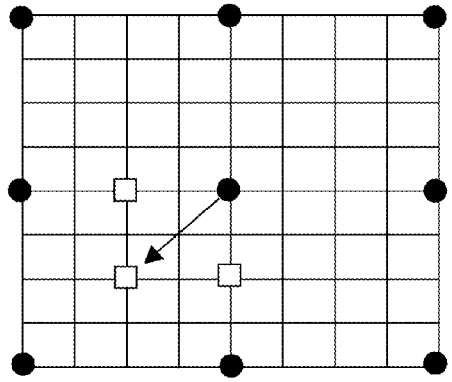

Referring to FIG. 7, a flowchart of a method for motion estimation according to the second embodiment is shown. The method is for performing fractional motion estimation with respect to an integer motion vector to increase the accuracy of fractional motion estimation, that is, to refine the integer motion vector, for example, an integer motion vector with minimum integer motion estimation cost. In the following exemplification, the coordinates of an integer motion vector being an integer position are used as a starting point (which could be viewed as the original point), such as the starting point P800 of FIG. 8, for performing fractional motion estimation. In FIG. 7, as in step S710, a predicted motion vector PMV is obtained, wherein the predicted motion vector, such as a default motion vector according to H.264, is determined according to the motion vectors of the adjacent macroblocks of the currently encoded macroblock. Next, the method proceeds to step S720, a plurality of first fractional search positions are generated according to the direction of the predicted motion vector, and the first fractional search positions are the first fractional positions closer to the direction, wherein the first fractional positions indicate the positions at a first fractional accuracy, for example, half-pixel accuracy. For example, an arrow A10 of FIG. 8 indicates the direction of the predicted motion vector is towards the top right, and the three half-pixel positions (such as the three hollowed squares) closer to the direction are used as the half-pixel search positions.

Then, the method proceeds to step S730, the FME is performed with respect to the first fractional search positions and the integer position to determine a first fractional optimum position, wherein the FME adopts parallel processing. For example, the FME unit calculates the rate-distortion cost of the three half-pixel search positions and the starting point P800 according to H.264, and determines the position with minimum RD cost, such as the position P810, as the first fractional optimum position. In step S740, a plurality of second fractional (such as quarter-pixel) search positions are generated according to the first fractional optimum position and the direction of the predicted motion vector. The second fractional search positions are the second fractional positions (i.e., the positions at a second fractional accuracy) closer to the direction of the predicted motion vector and the integer position. For example, in the vicinity of the position P810, the second fractional search positions are the second fractional positions (the positions denoted by the four hollowed triangles) closer to the direction of the predicted motion vector (the top right direction) and the integer position (i.e., the position P800).

Then, the method proceeds to step S750, the FME is performed with respect to the second fractional search positions to determine the second fractional optimum position such as the position P820, wherein the FME is implemented by parallel processing.

In step S720, the first fractional search positions generated according to the direction of the predicted motion vector are the first fractional positions closer to the direction. In an example as indicated in FIGS. 9A-9D, the search positions could have four scenarios based on the direction of the predicted motion vector. For example, according to different combinations of the + sign and the − sign of the coordinate direction, denoted by (x-dir, y-dir), there are scenario 1 to 4, namely, (+,+), (+,−), (−,−), (−,+), respectively. In step S720, a corresponding predetermined search direction, i.e., one of the search directions include bottom right, top right, top left and bottom left. As indicated by the arrows, and a number (such as three or two) of corresponding first fractional search positions could be identified from the four scenarios according to the direction of the predicted motion vector. All three positions are closer to the direction and are separated from the starting point by a first fractional coordinate, such as ½ pixel according to H.264.

Figure 10A:
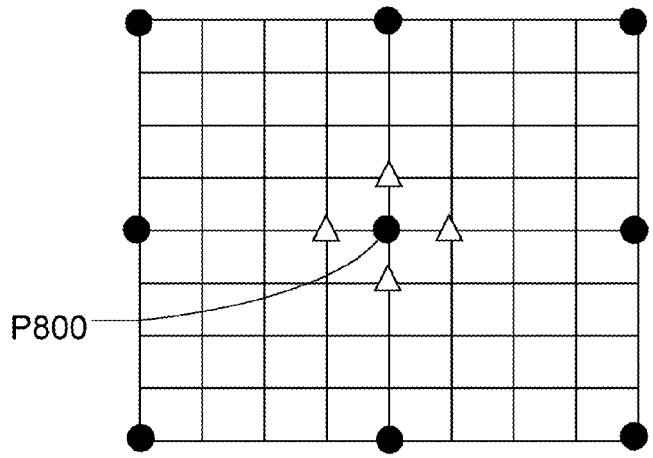
FIGS. 10A-10C respectively show three scenarios for selecting second fractional search positions and directions.

Furthermore, in step S740, all the second fractional search positions generated according to the first fractional optimum position and the direction of the predicted motion vector are the second fractional positions closer to the direction of the predicted motion vector and the integer position. The method of the present example is called "adaptive and direction-based location search". Three scenarios are illustrated in FIGS. 10A-10C.

Scenario 1: in step S730, if the original point P800 is identified as the first fractional optimum position, then the second fractional search positions could be set as being in the vicinity (upper, lower, left, and right positions) of the original point P800 and separated from the starting point by a second fractional coordinate, such as ¼ pixel according to H.264. For example, the second fractional search positions could be set as (¼,0), (0,¼), (−¼,0) and (0,−¼).

Figure 10B:
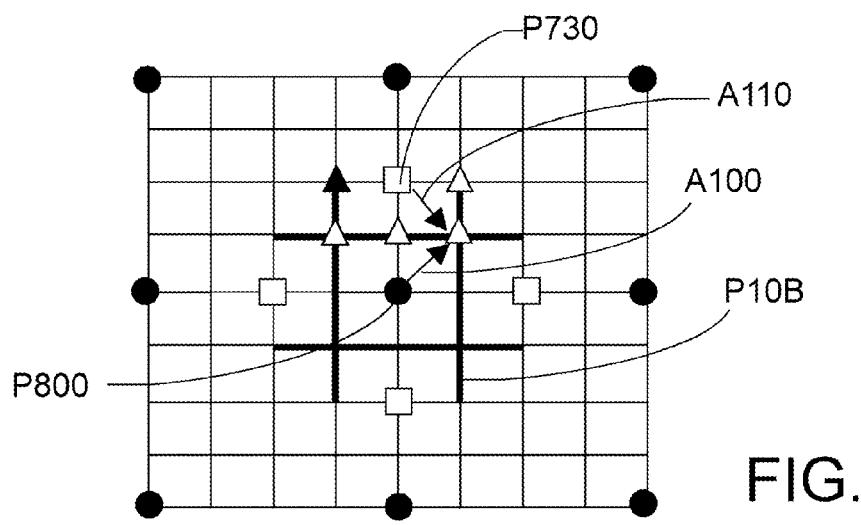

FIG. 10B shows scenario 2: if the first fractional optimum position P730 is not the original point P800, then the second fractional search positions could be selected from the five ¼ pixel positions (such as the positions denoted by triangles) according to an updated prediction direction A110. The updated prediction direction A110 is obtained according to the position P730 and the above mentioned direction of the predicted motion vector A100. As indicated in FIG. 10B, the updated prediction direction A110 indicates that the more accurate search positions should appear in the second fractional positions (such as the positions denoted in hollowed triangles) that are closer to the direction of the predicted motion vector A100 and the integer position P800. The coordinates of the second fractional positions are (¼,−½), (¼,−¼), (0,−¼) and (−¼,−¼), i.e., as indicated by the positions denoted by hollowed triangles. Similarly, if the updated prediction direction A110 is inclined to the bottom left, then the leftward four positions, namely, (−¼,−½), (−¼,−¼), (0,−¼) and (¼,−¼), are selected. Likewise, when the other optimum position P730 falls in the x-axis or the y-axis passing through the original point, the second fractional positions fall in the possible positions, for example, denoted by bold lines P10B of FIG. 10B.

Figure 10C:
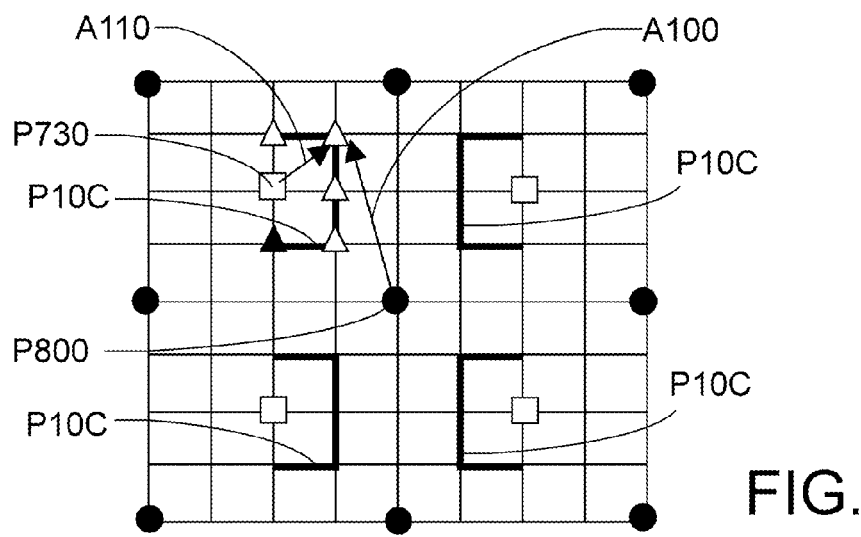

FIG. 10C shows scenario 3: if the first fractional optimum positions P730 are the squares of FIG. 10C, then the selection of the second fractional search position is similar to scenario 2 of FIG. 10B, and the similarities are not repeated here for the sake of brevity. For example, the second fractional positions fall in the possible positions, for example, denoted by bold lines P10C of FIG. 10C.

In the example of the second embodiment, fractional motion estimation finds an optimum position from four first or second fractional search positions. However, the present embodiment is not limited thereto. In other examples of the second embodiment, a number of search positions, such as three, four or five, could be generated in step S720 (or step S740) according to the direction of the predicted motion vector of fractional motion estimation. Further, in the present embodiment, the first fractional accuracy and the second fractional accuracy are not subjected to being ½ pixel and ¼ pixel respectively, and other fractional accuracy such as ⅓, ⅙ or ⅛ pixel could also be used. Besides, in other examples, the steps S740 and S750 of FIG. 7 could be repeated to make refinement. Also, the selection of the first or the second fractional search positions could be achieved in other way. That is, all first fractional search positions are first fractional positions closer to the direction of the predicted motion vector, and all second fractional search positions are second fractional positions closer to the direction of the predicted motion vector and the integer position.

Figure 11:
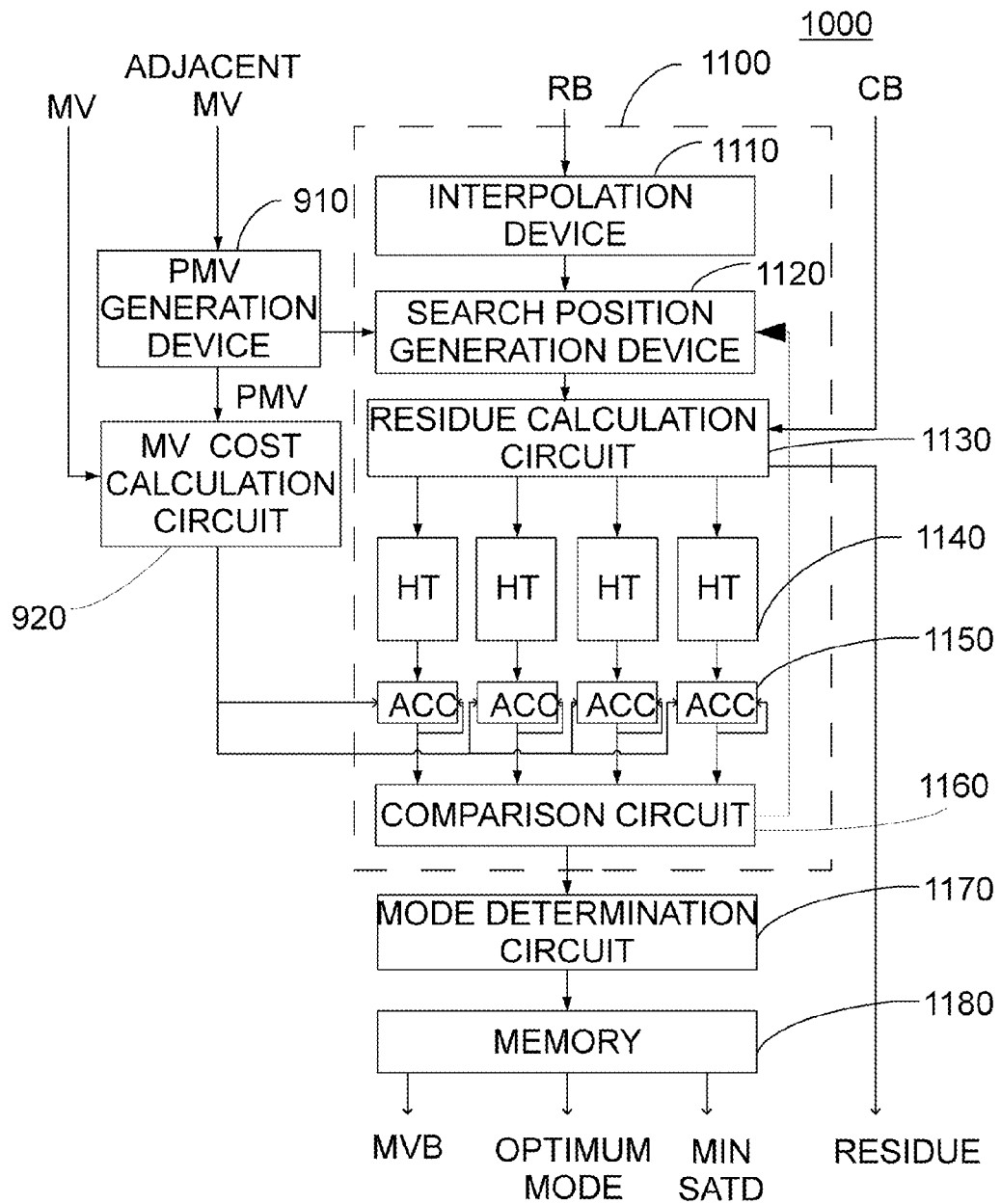
FIG. 11 shows a block diagram of a fractional motion estimation unit according to the second embodiment.

An apparatus for fractional motion estimation could be implemented according to the present embodiment. Referring to FIG. 11, a block diagram of a fractional motion estimation unit 1000 according to the present embodiment is shown. The fractional motion estimation unit 1000 includes a fractional motion estimation device 1100 and a mode determination circuit 1170, and a memory 1180 such as a buffer. The fractional motion estimation apparatus 1100 is implemented by hardware according to, for example, the fractional motion estimation method of FIG. 7. The predicted motion vector generation device 910 receives the motion vectors (MV) of the macroblocks adjacent to the current macroblock CB to generate a predicted motion vector PMV to implement step S710. The search position generation device 1120 generates suitable search positions with the interpolation device 1110 according to the predicted motion vector PMV so as to implement step S720. The search position generation device 1120 could determine the selection of scenarios, corresponding direction and search positions according to the coordinates of the predicted motion vector and could be implemented according to the approaches as indicated in FIGS. 9A-9D by using such as a digital circuit, a logic circuit, a look-up table or a firmware. When fractional motion estimation is performed according to the search positions, the fractional motion estimation apparatus 1100 needs to read a pixel RB of the reference frame and a pixel CB of the current macroblock. On the part of the fractional motion estimation apparatus 1100, the residue calculation circuit 1130, the Hadamard transform (HT) device 1140 (for implementing 4×4 Hadamard transform), and the accumulator (ACC) 1150, perform fractional motion estimation according to, for example, H.264 standard, and calculate the corresponding cost (such as the RD cost) of each search position. The residue calculation circuit 1130 reads the pixel CB of the current macroblock and further compares the pixel CB of the current macroblock with the search position generated by the search position generation device 1120 to generate and provide a residue to the HT device 1140, and could additionally outputs the residue data. There are four HT devices 1140 in total, which correspond to four search positions, adopt parallel processing, corporate with the ACC 1150 to obtain the SATD of each search position, and further corporate with the motion vector cost calculation circuit 920 to output the mvd_cost, so as to complete the calculation of the RD cost for each search position. Then, the search position with minimum cost is determined by the comparison circuit 1160, and step S730 is thus implemented. Besides, the search position generation device 1120 receives the first fractional optimum search position outputted from the comparison circuit 1160, and further generates the second fractional search positions according to the predicted motion vector PMV to implement step S740. For example, the search position generation device 1120 could select suitable search positions by way of circuit determination, look-up table or calculation according to the scenarios as indicated in FIGS. 10A-10C. Then, the fractional motion estimation apparatus 1100 implements step S750. Lastly, the second fractional optimum position is outputted to the mode determination circuit 1170, which determines the optimum mode according to the previously obtained integer motion vectors, the fractional motion vectors and parameters such as the cost and further outputs the optimum mode to the memory 1180. Thus, the data such as the optimum motion vector MVB, the optimum mode and the minimum SATD could be outputted for video processing such as encoding.

During the implementation of H.264, the predicted motion vector PMV must be generated according to the video system standard. Provided that the predicted motion vector PMV could be provided by the video processor, there is no need for the fractional motion estimation unit 1000 to generate the predicted motion vector PMV again. Therefore, in other implementations, at least one of the predicted motion vector generation device 910 and the motion vectors cost calculation circuit 920 could be regarded as a circuit not belonging to the fractional motion estimation unit 1000, or does not need to be implemented in the fractional motion estimation unit 1000, and the predicted motion vector PMV could be directly read from other portions of the video processor. In other embodiments, three or five sets of the HT device 1140 and the ACC 1150 of FIG. 11 could be employed, corresponding to three or five search positions in the course of FME.

The present embodiment is exemplified by H.264. However, the present embodiment could also be used in other instants of fractional motion estimation or video processing. In other instants of video processing, the Hadamard transform could be replaced with other transforms or cost calculation for the optimum search position. Any methods that generate search positions by fractional motion estimation according to the predicted motion vector, and further adaptively refine the search positions according to the predicted motion vector are within the scope of implementation of the present embodiment.

Third Embodiment

Under the circumstances that the number of the modes requiring fractional motion estimation is reduced according to the first embodiment, in the course of fractional motion estimation such as steps S510, S525, S535 and S545 of FIG. 5 and steps S610, S625, S635 and S645 of FIG. 6, the third embodiment performs estimation with the fewer number of search positions obtained in the second embodiment. Thus, the complexity and the required computation time for coding are reduced, and better efficiency is achieved. Referring to FIG. 2 and FIG. 3, the third embodiment could be regarded as implementing the first embodiment by the controller 100, the motion estimation unit 200 has the architecture as indicated in FIG. 2, and the FME unit 220 could be implemented according to the second embodiment.

Other Embodiments

The first embodiment and the second embodiment could be implemented separately. That is, during the implementation of the first embodiment, step S510 or S610 of fractional motion estimation could be implemented in a manner different from the second embodiment. Also, the implementation of the second embodiment could be incorporated in a manner different from the first embodiment to reduce the number of required modes or perform all of the modes. Further, the second embodiment may be implemented with an independent fractional motion estimation unit or a motion estimation apparatus including both integer motion estimation and fractional motion estimation. The above methods and hardware for implementing the embodiments, no matter used individually or collectively, are within the scope of implementation of the disclosure.

In addition to the above implementation by hardware structure, the method of the above embodiments could also be implemented, for example, by a processor, a digital signal processor and a digital video processor, or a programmable integrated circuit such as a microcontroller and a field programmable gate array (FPGA) circuit, wherein the circuit is designed using such as hardware description language (HDL).

Also, the method of the above embodiments could also be implemented by software. For example, in an example of the method according to the embodiments, the programming code could be recorded in a memory medium such as an ROM and an RAM, or an optical memory medium, a magnetic memory medium or other recording media, or could be realized by firmware. The video processor (such as an encoder or a microprocessor) of a computation apparatus could read the memory medium recording the programming code of the method of the embodiments and further perform the programming code to implement the method of the embodiments. Moreover, the method of the above embodiments could be implemented by combining software and hardware.

The first embodiment of the disclosure provides a method for motion estimation, which reduces the number of the modes requiring fractional motion estimation, hence increasing the efficiency of fractional motion estimation. The second embodiment provides a method for motion estimation, which reduces the number of search positions during fractional motion estimation, so that the required computation resources or hardware resources are reduced. Under the circumstances that the number of the modes requiring fractional motion estimation is decreased according to the above embodiments, fractional motion estimation could be performed with fewer search positions. Thus, the complexity and the required computation time for coding are reduced, and the overall computation time of motion estimation is largely reduced in comparison to the implementation which performs fractional motion estimation with respect to all modes.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for motion estimation, the method comprising:
in the course of motion estimation:
a. performing integer motion estimation with respect to a macroblock to generate a plurality of integer motion vectors, and
b. determining, according to a portion of the integer motion vectors, which correspond to a plurality of first block modes, whether the integer motion vectors of each first block mode are substantially equal to those of corresponding upper-layer block mode(s) of a second block mode so as to determine whether to perform or skip fractional motion estimation of the first block mode, wherein each corresponding block of the upper-layer block mode(s) of the second block mode is greater than the first block mode; wherein the performing of the fractional motion estimation of each of the first block modes comprises performing a half-pixel motion estimation to determine a half-pixel optimum position according to a direction of a predicted motion vector and performing a quarter-pixel motion estimation according to the direction of the predicted motion vector and the half-pixel optimum position to determine a quarter-pixel optimum position;
wherein the portion of the integer motion vectors correspond to the first block modes including block modes 1, 2, 3, and P8×8, and the step b comprises:
performing fractional motion estimation of the block mode 1;
determining whether the integer motion vectors of the block mode 2 are substantially equal to the integer motion vector of the block mode 1; if not, then the method performs fractional motion estimation of the block mode 2 and proceeds to the subsequent step; if so, then the method skips the fractional motion estimation of the block mode 2 and proceeds to the subsequent step;
determining whether the integer motion vectors of the block mode 3 are substantially equal to the integer motion vector of the block mode 1; if not, then the method performs the fractional motion estimation of the block mode 3 and proceeds to the following step; if so, then the method skips fractional motion estimation of the block mode 3 and proceeds to the subsequent step;
determining whether the integer motion vectors of the block mode P8×8 are substantially equal to the integer motion vectors of the block mode 1, 2 or 3; if not, then the method performs fractional motion estimation of the block mode P8×8; if so, then the method skips fractional motion estimation of the block mode P8×8;
wherein the step of performing the half-pixel motion estimation comprises:
generating a plurality of half-pixel search positions that are related to the direction of the predicted motion vector according to the direction of the predicted motion vector; wherein the direction includes bottom right, top right, top left, and bottom left; and
performing the half-pixel motion estimation with respect to the half-pixel search positions and an integer position used as an original point to determine the half-pixel optimum position; and
wherein the step of performing the quarter-pixel motion estimation comprises:
generating a plurality of quarter-pixel search positions related to the direction of the predicted motion vector and the original point according to the direction of the predicted motion vector and the half-pixel optimum search position; and
performing the quarter-pixel motion estimation with respect to the quarter-pixel search positions to determine the quarter-pixel optimum position.

2. The method according to claim 1, wherein in the step b, the block mode P8×8 corresponds to the integer motion vectors of an optimum mode of the 8×8 types of each of the four 8×8 blocks of the macroblock.

3. The method according to claim 1, wherein the step b further comprises determining whether to perform or skip fractional motion estimation of the block mode according to relationship of motion vector differential cost between the first block mode and the upper-layer block mode(s) of the second block mode.

4. The method according to claim 1, wherein the portion of the integer motion vectors correspond to the block modes including block modes 1, 2, 3, and P8×8, and the step b comprises:
determining whether the integer motion vectors of the block mode 2 are substantially equal to the integer motion vector of the block mode 1 and whether motion vector differential cost of the block mode 2 is greater than that of the block mode 1; if not, then the method performs fractional motion estimation of the block mode 2 and proceeds to the following step; if so, then the method skips fractional motion estimation of the block mode 2 and proceeds to the subsequent step;
determining whether the integer motion vectors of the block mode 3 are substantially equal to the integer motion vector of the block mode 1 and whether motion vector differential cost of the block mode 3 is greater than that of the mode 1; if not, then the method performs fractional motion estimation of the block mode 3 and proceeds to the subsequent following step; if so, then the method skips fractional motion estimation of the block mode 3 and proceeds to the subsequent step;
determining whether the integer motion vector of the block mode 1 substantially equal to those of the block mode 2 and whether the fractional motion estimation of the block mode 2 is performed, or whether the integer motion vector of the block mode 1 is substantially equal to those of the block mode 3 and the fractional motion estimation of the block mode 3 is performed; if not, then the method performs fractional motion estimation of the block mode 1 and proceeds to the following step; if so, then the method skips fractional motion estimation of the block mode 1 and proceeds to the subsequent step;
determining whether the integer motion vectors of the block mode P8×8 are substantially equal to those of the block mode 1, 2 or 3; if not, then the method performs fractional motion estimation of the block mode P8×8; if so, then the method skips fractional motion estimation of the block mode P8×8.

5. The method according to claim 4, wherein in the step b, the block mode P8×8 corresponds to the integer motion vectors of an optimum mode of the 8×8 types of each of the four 8×8 blocks of the macroblock.

6. A method for motion estimation, the method comprising:
in the course of motion estimation:
performing a half-pixel motion estimation according to a direction of a predicted motion vector to determine a half-pixel optimum position;
wherein the step of performing the half-pixel motion estimation comprises:

generating a plurality of half-pixel search positions that are related to the direction of the predicted motion vector according to the direction of the predicted motion vector; wherein the direction includes bottom right, top right, top left, and bottom left; and performing the half-pixel motion estimation with respect to the half-pixel search positions and an integer position used as an original point to determine the half-pixel optimum position; and performing a quarter-pixel motion estimation according to the direction of the predicted motion vector and the half-pixel optimum position to determine a quarter-pixel optimum position;

wherein the step of performing the quarter-pixel motion estimation comprises:

generating a plurality of quarter-pixel search positions related to the direction of the predicted motion vector and the original point according to the direction of the predicted motion vector and the half-pixel optimum search position; and performing the quarter-pixel motion estimation with respect to the quarter-pixel search positions to determine the quarter-pixel optimum position; and wherein the half-pixel motion estimation and the quarter-pixel motion estimation adopt parallel processing; and if the direction of the predicted motion vector is bottom right, the half-pixel search positions include (0, 0), (½, 0), (½, ½) and (0, ½);

if the direction of the predicted motion vector is top right, the half-pixel search positions include (0, 0), (½, 0), (½, −½) and (0, −½);

if the direction of the predicted motion vector is top left, the half-pixel search positions include (0, 0), (0, −½), (−½, −½) and (−½, 0); and if the direction of the predicted motion vector is bottom left, the half-pixel search positions include (0, 0), (−½, 0), (−½, ½) and (0, ½).

7. The method according to claim 6, wherein the predicted motion vector is determined according to motion vectors of adjacent macroblocks of a currently encoded macroblock.

8. An apparatus with motion estimation, comprising:

a motion estimation unit, in the course of motion estimation, for performing integer motion estimation with respect to a macroblock to generate a plurality of integer motion vectors; and a control unit for determining, according to a portion of the integer motion vectors, which correspond to a plurality of first block modes, whether the integer motion vectors of each first block mode are substantially equal to those of corresponding upper-layer block mode(s) of the second block mode, and for selectively controlling the motion estimation unit to perform or skip fractional motion estimation of the first block mode, wherein each corresponding block of the upper-layer block mode of the second block mode is greater than the first block mode;

wherein the motion estimation unit, in response to a control signal of the control unit, indicative of performing the fractional motion estimation of the first block mode, performs a half-pixel motion estimation to determine a half-pixel optimum position according to a direction of a predicted motion vector, wherein the motion estimation unit further performs a quarter-pixel motion estimation to determine a quarter-pixel optimum position according to the direction of the predicted motion vector and the half-pixel optimum position;

wherein in performing the half-pixel motion estimation, the motion estimation unit performs:

generating a plurality of half-pixel search positions that are related to the direction of the predicted motion vector according to the direction of the predicted motion vector; wherein the direction includes bottom right, top right, top left, and bottom left; and performing the half-pixel motion estimation with respect to the half-pixel search positions and an integer position used as an original point to determine the half-pixel optimum position; and wherein in performing the quarter-pixel motion estimation, the motion estimation unit performs:

generating a plurality of quarter-pixel search positions related to the direction of the predicted motion vector and the original point according to the direction of the predicted motion vector and the half-pixel optimum search position; and performing the quarter-pixel motion estimation with respect to the quarter-pixel search positions to determine the quarter-pixel optimum position.

9. The apparatus according to claim 8, wherein the control unit further determines whether to control the motion estimation unit to perform or skip fractional motion estimation of the first block mode according to relationship of motion vector differential cost between the first block mode and the upper-layer block mode(s) of the second block mode.

10. An apparatus with motion estimation, comprising:

an integer motion estimation unit; and a fractional motion estimation unit, in the course of motion estimation, in response to an integer motion vector generated by the integer motion estimation unit, for refining the integer motion vector;

wherein the fractional motion estimation unit performs a half-pixel motion estimation with respect to the integer motion vector to determine a half-pixel optimum position according to a direction of a predicted motion vector; and the fractional motion estimation unit performs a quarter-pixel motion estimation to determine a quarter-pixel optimum position according to the direction of the predicted motion vector and the half-pixel optimum position;

wherein in performing the half-pixel motion estimation, the fractional motion estimation unit performs:

generating a plurality of half-pixel search positions that are related to the direction of the predicted motion vector according to the direction of the predicted motion vector; wherein the direction includes bottom right, top right, top left, and bottom left; and performing the half-pixel motion estimation with respect to the half-pixel search positions and an integer position used as an original point to determine the half-pixel optimum position; and wherein in performing the quarter-pixel motion estimation, the fractional motion estimation unit performs:

generating a plurality of quarter-pixel search positions related to the direction of the predicted motion vector and the original point according to the direction of the predicted motion vector and the half-pixel optimum search position; and performing the quarter-pixel motion estimation with respect to the quarter-pixel search positions to determine the quarter-pixel optimum position;

wherein the fractional motion estimation unit adopts parallel processing on the half-pixel motion estimation and the quarter-pixel motion estimation; and if the direction of the predicted motion vector is bottom right, the half-pixel search positions include (0, 0), (½, 0), (½, ½) and (0, ½);
if the direction of the predicted motion vector is top right, the half-pixel search positions include (0, 0), (½, 0), (½, −½) and (0, −½);
if the direction of the predicted motion vector is top left, the half-pixel search positions include (0, 0), (0, −½), (−½, −½) and (−½, 0); and
if the direction of the predicted motion vector is bottom left, the half-pixel search positions include (0, 0), (−½, 0), (−½, ½) and (0, ½).

* * * * *